Aug. 28, 1934.  W. C. BATES ET AL  1,971,807
BATCH WEIGHING APPARATUS
Filed Aug. 5, 1931   3 Sheets-Sheet 3

Patented Aug. 28, 1934

1,971,807

UNITED STATES PATENT OFFICE 1,971,807

BATCH WEIGHING APPARATUS

Walter C. Bates, Pittsburgh, Pa., and John O. Krosse, Painesville, Ohio, assignors to The Standard Silicate Company, Cincinnati, Ohio, a corporation of Ohio Application August 5, 1931, Serial No. 555,242

9 Claims. (Cl. 249—20)

This invention relates to batch weighing apparatus.

It is among the objects of this invention to provide batch weighing apparatus which is adapted to weigh and deliver in predetermined amounts material supplied to it, is of relatively simple and sturdy construction, adapted to operate with material supplied continuously or intermittently and at constant or varying rates, in the use of which continuous delivery of material does not interfere with discharge of the immediately preceding weighed portion, and is fully automatic.

A particular object is to provide apparatus embodying the preceding objects which is also adapted to indicate the total weight of material received and delivered by it during any given time.

Figure 1:
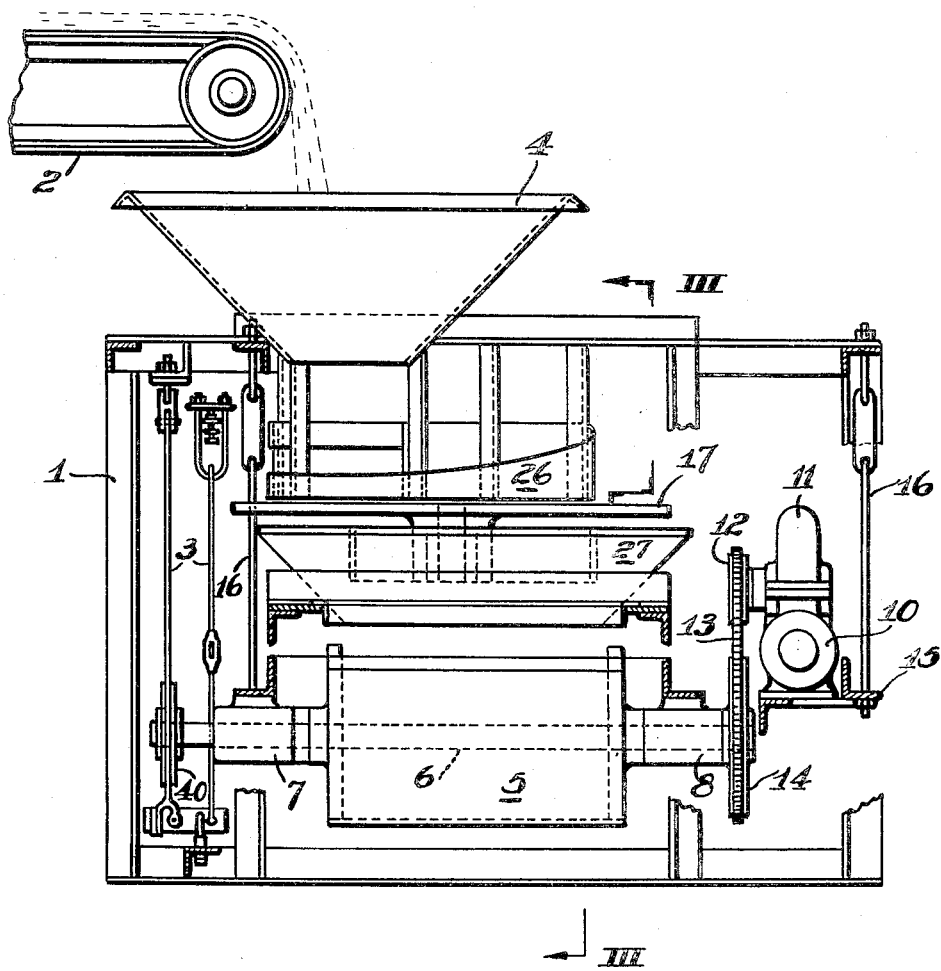
Figure 2:
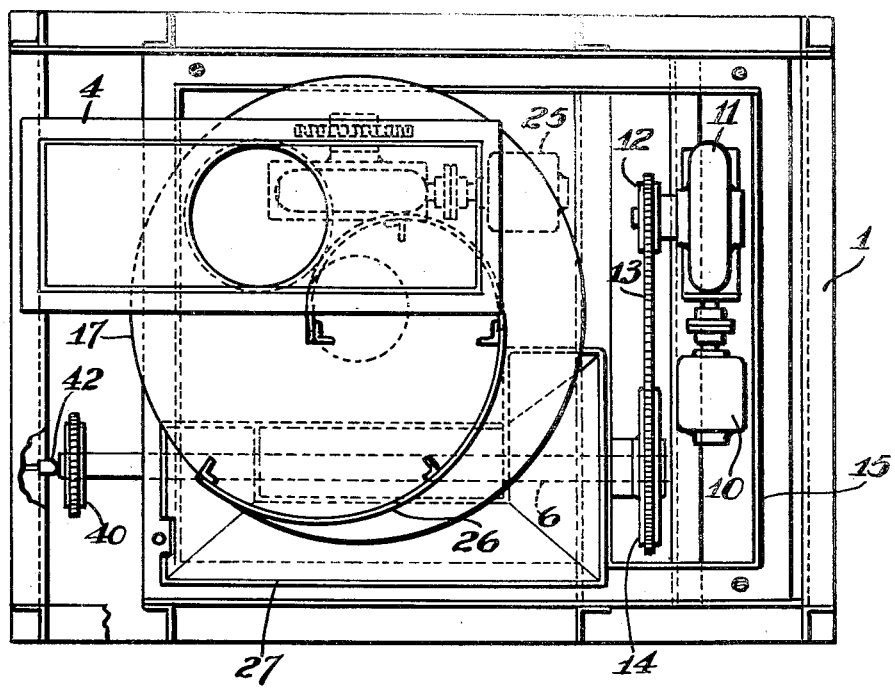
Figure 3:
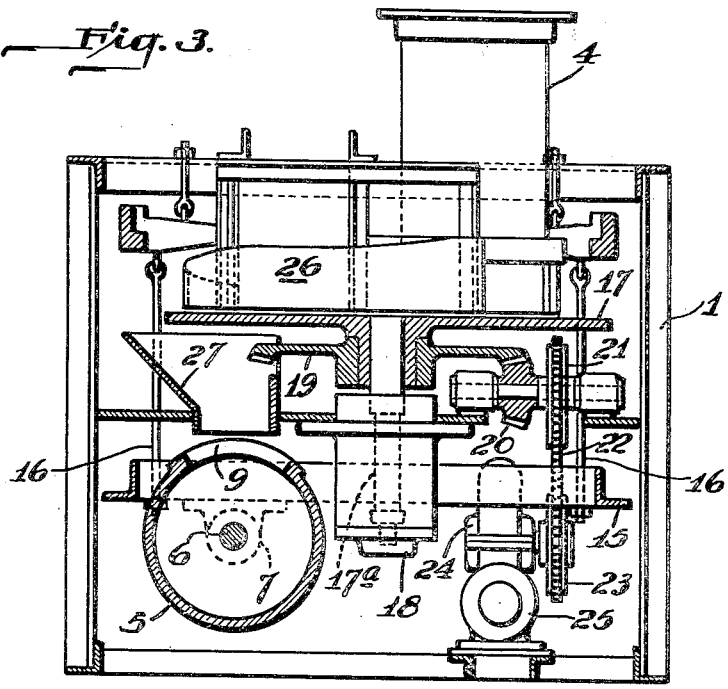
Figure 4:
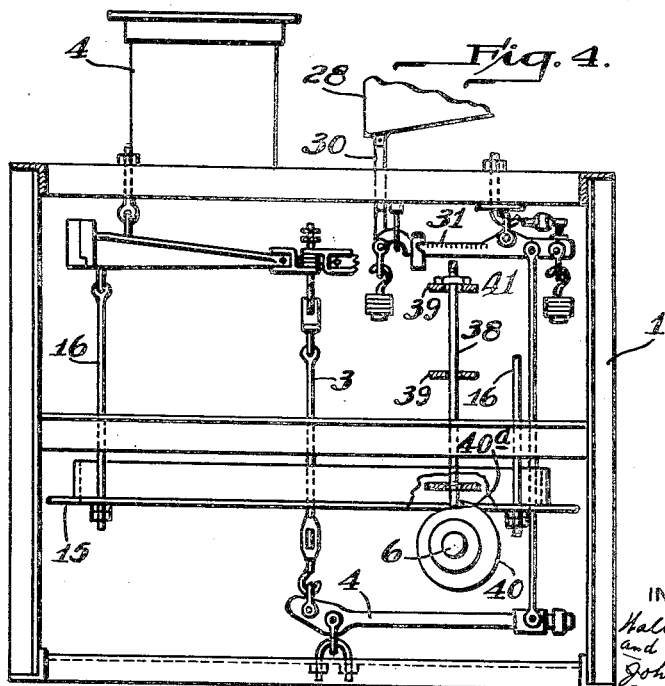

The invention may be described in connection with the illustrative embodiment shown in the accompanying drawings, in which Fig. 1 is a side elevation of the apparatus; Fig. 2 a plan view; Fig. 3 a sectional view taken on line III—III, Fig. 1; Fig. 4 an end elevation from the left hand side of Fig. 1, showing the weighing and control mechanism only; and Fig. 5 a view showing one form of automatic motor control switch and wiring diagram.

The apparatus provided by the invention comprises a weighing mechanism, a material-receiving hopper arranged as the weighing element thereof, and material feeding means adapted to receive material to be weighed and to deliver it directly to the hopper while the content of material in the hopper is below a predetermined weight. The hopper is adapted to discharge its contained material when it reaches such predetermined weight, and means actuated by the response of the weighing mechanism to the attainment of that weight are provided for causing the hopper to dump. The apparatus is provided also with means associated with the material delivering, or feeding, means for shutting off feed to the hopper during dumping, but without interfering with the reception of material by the delivery mechanism.

In connection with manufacturing operations it is frequently desirable to known at any time what the output of a process of apparatus has been during a given preceding interval of time. Especially is this true of substantially continuous operations in which the output is not constant but varies, as in the case of cement and other kilns. This can be accomplished most suitably by batch weighing. The apparatus provided by this invention, although it may be applied to various uses, is especially adapted for that purpose, and will be so described in detail. In such embodiments automatic recording mechanism is provided also to show the amount of material that has passed through the apparatus.

The invention may be understood further by reference to the accompanying drawings.

As there shown the apparatus comprises a structural section framework, indicated generally by the numeral 1, associated with a material-supplying source, such as the outlet of a kiln, or, as shown, below the discharge end of a belt conveyor 2. Mounted in the framework is a suitable weighing mechanism 3, the form shown being of a conventional style generally designated as a hopper suspension scale. This and other weighing mechanisms suitable for the purposes of the invention are well known in the art, so that the skilled worker needs no further detailed description.

In accordance with this invention the weighing element comprises a hopper arranged to receive the material to be weighed, and adapted to discharge its contents at the proper time. Preferably there is used a rotary dumping hopper. The form shown comprises a drum 5 provided with an axially disposed shaft 6 journalled in bearings 7 and 8. One side of the drum is provided with a longitudinal opening 9 for receiving or dumping material as the case may be. When the drum contains a predetermined weight of material it is rotated by means of a motor 10, reducing gear 11, sprocket wheel 12, sprocket chain 13, and sprocket 14 keyed on shaft 6, motor 10 being energized at the proper time in a manner presently to be described.

In order that the hopper may constitute the weighing element of scale 3 it is supported, together with the driving means just described, by a floating framework 15 suspended from levers 16 of weighing mechanism 3. In its material-receiving position the hopper is disposed with its opening 9 turned upwardly to receive the material from source 2.

In order to avoid loss of material or temporary stoppage of the supply source during dumping, means are provided for receiving the material continuously from the supply source and adapted to feed the material to the hopper while its contents are below the unit weight for which the scales are set, and to accumulate the material without feeding it during the dumping cycle. Such means may assume a variety of forms. That shown comprises a horizontal table 17 mounted above hopper 5 on a centrally disposed shaft 17a rotatably supported by a bearing 18 carried by framework 1. The table is rotated through a gear 19 keyed to shaft 17a and meshing with a pinion 20, sprocket 21, sprocket chain 22, sprocket 23, and a reducing gear 24 driven by a motor 25.

The material from belt 2 falls through a feed tube 4 onto table 17, and rotation of the table carries it into contact with a fixed spiral guide, or scraper, 26 suspended over table 17. This guide is arranged to permit the material to be received by the table and to scrape it gradually into a second feed tube 27 which directs it through opening 9 into hopper 5.

In the use of this apparatus the weighing mechanism is set for any suitable value, depending, of course, upon the material and the hopper capacity. The material falls from belt 2 through feed tube 4 to table 17 and thence to hopper 5, as described. During this portion of the cycle motor 25 is operating, and the circuit of motor 10 is open, so that table 17 is rotated, and hopper 6 remains stationary with its opening below feed tube 27. When the contents of the hopper reach the weight for which scale 3 is set, the circuit of motor 25 is opened and that of motor 10 closed, thus stopping table 17 and simultaneously driving sprocket chain 13, which causes the hopper to rotate and dump its charge. When the hopper has passed through one complete revolution its load has been discharged and opening 9 is again in position to receive material. During this time table 17 has been receiving material, but has been inoperative to feed. As soon as the hopper has returned to its initial position motor 25 again starts, and motor 10 stops. This cycle is repeated as the hopper is filled and dumped.

Figure 5:
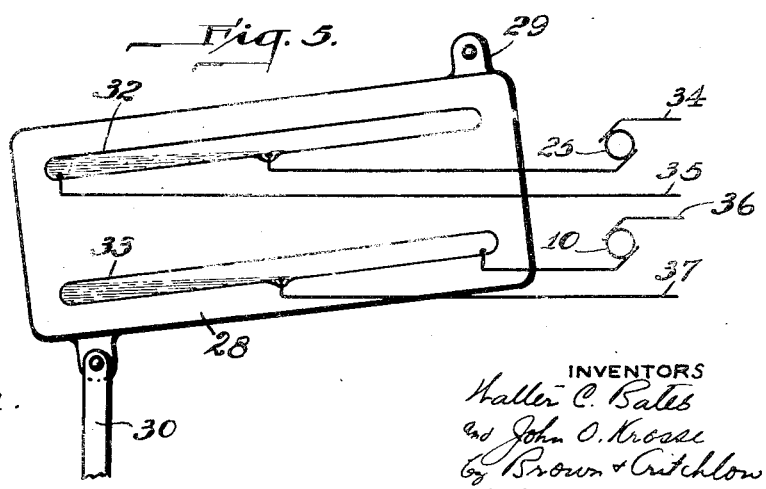

Such control of these drive mechanisms may be obtained by means of various types of automatic switches. The switch shown comprises a vertically disposed plate 28, Fig. 5, pivotally mounted at one corner 29 and connected pivotally at the diagonally opposite corner to a link 30 connected to beam 31 of weighing mechanism 3. Mounted on the plate are glass tubes 32 and 33 containing a suitable mobile conductor, such as mercury. Tube 32 is provided with sealed-in leads connected to wires 34 and 35 forming the circuit of motor 25, these leads being situated a suitable distance apart toward one end of the tube. Circuit wires 36 and 37 of motor 10 are similarly connected to leads sealed into tube 33, these leads being arranged toward the end opposite those of tube 32, as shown in Fig. 5.

As may be seen in Fig. 5, plate 28 is so tilted by beam 31 when the hopper content is below the weighing value that the tubes are inclined. In this position the mercury flows downwardly in the tubes to close the circuit of motor 25 and to break that of motor 10. Hence as long as the hopper does not contain the amount of material for which the scales are set, table 17 is rotated, causing material to be fed to the hopper as it is received from the belt, the hopper meanwhile remaining stationary.

Beam 31 trips as soon as sufficient material has been fed to the hopper to bring it to the set value. This urges link 30 upwardly, reversing the inclination of plate 28 sufficiently to cause the mercury to flow toward the opposite end of the tubes, thereby opening circuit 34—35 and closing circuit 36—37. Thereupon operation of motor 10 causes hopper 5 to rotate and discharge its contents, and during the time the hopper makes one revolution the material accumulates on table 17, source 2 being free to continue its operation uninterruptedly. The degree of inclination of the switch may be increased by the use of any suitable motion magnifying linkage. It will be understood, of course, that other types of switches may be used, and that switch actuation may be effected by attainment of the set weights from points other than the scale beam, as by hopper movement under the set load.

As soon as dumping starts the decreased weight normally would cause beam 31 to fall, thus actuating the switch to stop motor 10 and start motor 25. An important feature of the invention resides in the provision of means for completing dumping while maintaining the material-feeding means inoperative for feeding during this period. This may be accomplished in various ways, one of which is shown in Fig. 4. A rod 38 is supported below beam 31 by guides 39 so as to be vertically slidable in the guides. At its lower end rod 38 bears against a cam 40 keyed upon shaft 6. When the hopper rotates the cam is turned, and the cam is so shaped as to urge the rod upwardly against beam 31. The cam maintains this thrust on beam 31 during the entire revolution of hopper 5, so that the beam is kept in tripped position, and the switch stays in position to complete dumping. When the hopper has returned to its material-receiving position break 40a in the cam permits the rod to drop, which permits beam 31 to drop, thus moving the switch to its former position, stopping motor 10 and starting motor 25. The upper end of the rod may be, and preferably is, provided with an adjustment screw 41, as shown in Fig. 4, to permit adjustment of its length to compensate for wear.

For the purpose of showing how much material has passed through the apparatus it is provided also with means for automatically indicating the total weight. This is accomplished most simply by connecting a recording revolution counter 42, Fig. 2 to shaft 6. Each time the hopper dumps the device records one revolution, and by multiplying the number of revolutions for any given period, for instance an hour, or 24 hours, by the unit weight which causes the beam to be tripped there is obtained directly the total weight for the period.

Thus there is provided a simple and effective apparatus adapted especially to show at any time the output of an apparatus, either of a unit, or of a group of units. It is fully automatic and does not interfere at all with continuous feeding of the material, while preventing loss of material and consequent vitiation of weight figures during dumping. The form described may be varied according to need. For instance a continuous weight recording instrument may be substituted for the revolution counter shown, and other means for receiving and delivering the material than that described may be used.

The apparatus is useful also whenever a batch weigher is needed. Thus it may be used in compounding mixes, as in the manufacture of glass, where predetermined weights of various ingredients must be measured out frequently. In such case it automatically weighs the correct amount.

According to the provisions of the patent statutes, we have explained the principle and mode of operation of our invention and have illustrated and described what we now consider to represent its best embodiment. However, we desire to have it understood that, within the scope of the appended claims, the invention may be practiced otherwise than as specifically illustrated and described.

We claim:

1. A batch weighing apparatus comprising weighing mechanism, a rotatably mounted hopper associated with the weighing mechanism as the weighing element thereof, power-driven feeding mechanism positioned to receive material to be weighed from a source and to feed it to the hopper at a relatively uniform rate, power-actuated means operatively connected to the hopper for positively rotatively dumping the hopper, said power-actuated means including energizing means associated with said weighing mechanism and operable thereby to institute said positive dumping of the hopper when it contains a predetermined weight of said material, driving means connected to said feeding mechanism, and control means associated with said driving means to render the feeding mechanism inoperative during dumping of the hopper and to reinstate feeding to the hopper at said rate after the hopper has been dumped.

2. A batch weighing apparatus comprising weighing mechanism, a rotatably mounted hopper associated with the weighing mechanism as the weighing element thereof, power-driven feeding means positioned to receive material to be weighed from a source and to feed it to the hopper at a relatively uniform rate, power-driven means operatively connected to the hopper for rotatively dumping it, power-actuated driving means connected to said feeding mechanism, and control means associated with both said driving means and actuated by said weighing mechanism to actuate the hopper dumping means when the hopper contains a predetermined weight of said material and simultaneously to render the feeding mechanism inoperative during dumping of the hopper and to reinstate feeding to the hopper at said rate after the hopper has been dumped.

3. A batch weighing apparatus comprising weighing mechanism, a material-receiving hopper rotatably associated with said mechanism as the weighing element, motor driven means for receiving said material from a source and feeding it to said hopper while its content of said material is below a predetermined weight, a power circuit for said motor, motor-actuated means for dumping said hopper when its content of said material reaches said weight, a power circuit for the motor of said dumping means, and switch control means in the power circuits of said motors actuated by the beam of said weighing mechanism to dump the hopper when its content of material reaches said weight and concurrently to render said feeding means inoperative to feed.

4. A batch weighing apparatus comprising weighing mechanism, a hopper associated with said mechanism as the weighing element thereof, means for dumping said hopper when it contains a predetermined weight of material to be weighed, feeding means for receiving said material and delivering it to said hopper comprising a rotatably mounted feed table disposed to receive said material from a source, means for rotating said table including a motor and a power circuit therefor, and a scraper associated with said table for scraping material received by it into said hopper when the table is rotated, and control means actuated by the weighing mechanism for opening the circuit of the table-rotating motor and concurrently dumping the hopper when it contains said weight of material, and for starting said motor again when dumping is complete.

5. A batch weighing apparatus comprising weighing mechanism, an open top hopper rotatably mounted in said weighing mechanism as the weighing element thereof, means for rotating said hopper to dump it intermittently including a motor and a power circuit therefor, means for receiving material to be weighed and delivering it to said hopper comprising a rotatably mounted table, means for rotating said table including a motor and a power circuit therefor, and a scraper associated with said table for scraping material received by the table into said hopper when the table is rotated, and switch control means in the power circuits of said motors and actuated by the beam of said weighing mechanism to maintain the table-rotating motor circuit closed and the hopper-dumping motor circuit open as long as the material in said hopper is below a predetermined weight, and actuated upon the attainment of such weight to reverse said relationship of the motor circuits.

6. A batch weighing apparatus comprising weighing mechanism, a hopper associated with said mechanism as the weighing element thereof, means for dumping said hopper when it contains a predetermined weight of material to be weighed, feeding means for receiving said material and delivering it to said hopper comprising a rotatably mounted feed table disposed to receive said material from a source, means for rotating said table including a motor and a power circuit therefor, and a scraper associated with said table for scraping material received by it into said hopper when the table is rotated, control means actuated by the weighing mechanism for opening the circuit of the table-rotating motor and concurrently dumping the hopper when it contains said weight of material, and for starting said motor when dumping is complete, and means for indicating the total weight of said material received by the hopper in a given time.

7. A batch weighing apparatus comprising weighing mechanism, a rotatably mounted hopper associated with said weighing mechanism as the weighing element, feeding means for receiving said material from a source and adapted to feed the material directly to the hopper as long as its content of said material is below a predetermined weight, power-actuated means for rotating said hopper when it contains said weight of material, means controlling said feeding means to render it inoperative to feed during dumping of the hopper, means actuated by the beam of said weighing mechanism for energizing said dumping means when the beam is tripped, and means for holding the beam tripped until dumping is complete including a cam associated with the hopper at one end thereof, a rod adapted to bear at one end against said beam and bearing at its other end against said cam, rotation of said cam during dumping urging the rod upwardly against the beam to hold it in tripped position.

8. A batch weighing apparatus comprising weighing mechanism, a material-receiving hopper associated with said mechanism as the weighing element, feeding means for receiving said material from a source and for feeding it to said hopper, power actuated means for dumping said hopper when its content of said material reaches a predetermined weight, control means actuated by the beam of said weighing mechanism for energizing said dumping means when the hopper contains said weight of material and concurrently to render said feeding means inoperative to feed, and means acting between said dumping means and said beam for maintaining the beam in tripped position until dumping is complete.

9. A batch weighing apparatus comprising weighing mechanism, a material-receiving hopper associated with said mechanism as the weighing element, feeding means for receiving said material from a source and for feeding it to said hopper, power actuated means for dumping said hopper when its content of said material reaches a predetermined weight, control means actuated by the beam of said weighing mechanism for energizing said dumping means when the hopper contains said weight of material and concurrently to render said feeding means inoperatve to feed, and means acting between said dumping means and said beam for maintaining the beam in tripped position until dumping is complete, and means for indicating the total weight of material received by the hopper in a given period.

WALTER C. BATES.
JOHN O. KROSSE.